Patented Sept. 26, 1944

2,358,855

UNITED STATES PATENT OFFICE 2,358,855

PURIFICATION OF CAMPHENE

Gastao Etzel, Newark, Del., assignor to E. I. du Pont de Nemours & Company, Wilmington, Del., a corporation of Delaware No Drawing. Application May 23, 1941, Serial No. 394,801

7 Claims. (Cl. 260—675.5)

This invention relates to a process for the purification of camphene and particularly to the purification of technical camphene obtained by the methods ordinarily employed in commercial practice.

Camphene is generally synthesized commercially by either one of two methods. One method comprises the catalytic isomerization of pinene followed by a separation of the catalyst and fractional distillation. The second method comprises treating pinene with dry hydrogen chloride at about 0° C. to about 15° C. to produce bornyl chloride which is then treated with dolomite, aniline or sodium phenolate to produce crude camphene which is fractionally distilled. The camphene, resulting from the fractional distillation of the products of the above processes, is generally known as technical camphene.

Technical camphene has a freezing point of from about 35° C. to about 40° C. It contains impurities which have approximately the same boiling point as the camphene and hence are difficult to separate from the camphene by physical means such as fractional distillation or the sweating process. The technical camphene, when converted to camphor, results in a product having a melting point of from about 158° C. to about 164° C. containing a substantial amount of objectional impurities.

It is an object of the present invention to provide a method for purifying technical camphene. Another object is to provide a method for converting the impurities in technical camphene to products which may be more readily separated from the camphene by physical means. A further object is to provide a method for selectively converting the impurities in technical camphene to higher boiling compounds and then separating such impurities from the camphene. Other objects are to advance the art. Still other objects will appear hereinafter.

The above and other objects may be accomplished in accordance with my invention which comprises selectively converting the impurities in technical camphene to higher boiling compounds and then separating the camphene therefrom by any suitable method, such as fractional distillation. I have found that the impurities, in technical camphene, can be converted to higher boiling compounds without changing any substantial amount of the camphene.

There are various procedures which may be followed to convert the impurities in technical camphene to higher boiling compounds. One procedure, which I have found to be satisfactory, comprises heating the technical camphene at from about 225° C. to about 350° C., preferably at about 250° C., in a closed reaction vessel under superatmospheric pressures. A second procedure, which may be followed, comprises heating the technical camphene with a surface active catalyst at temperatures of from about 100° C. to about 350° C. and preferably with a solid silicate catalyst at temperatures of at least 130° C. in a closed vessel and at superatmospheric pressures. A third procedure comprises treating the technical camphene with an acid catalyst such as a dilute solution of sulfuric acid in water or an aqueous solution of p-toluene sulfonic acid, at temperatures of from about 10° C. to about 180° C. and preferably at temperatures of from about 40° C. to about 60° C.

The extent to which the impurities are converted to higher boiling compounds and hence the extent of purification of the camphene will depend upon and vary with the particular procedure and conditions employed. When technical camphene is heated at about 250° C. in the absence of a catalyst, the camphene, after fractional distillation from the modified impurities, has a freezing point of from about 44° C. to 45° C. When a surface active catalyst is employed, camphene, having a freezing point from about 45° C. to about 48° C., is obtained. When an acid catalyst is employed, camphene, having a freezing point of about 45° C., is obtained. I have found that the most satisfactory procedure, from a practical standpoint, comprises heating the technical camphene in the presence of a surface active catalyst and particularly a solid silicate catalyst. The surface active catalysts may be divided into two groups. The first group requires temperatures of from about 225° C. to about 350° C. and preferably of from about 245° C. to about 300° C. The preferred catalyst of this group is vermiculite which is preferably employed at about 250° C. The vermiculite may be employed as it comes from the mine, or after being dried at a temperature from room temperature to 1000° C. It is a non-metallic mineral of the mica family and is a hydrated aluminum magnesium silicate. Representative members of this class of catalysts are:

Vermiculite=magnesium aluminum silicate
Pyrophyllite=$Al_2O_3H_2O.4SiO_2$
Kaolinite=$H_4Al_2Si_2O_9$
"Filter-Cel"=kieselguhr=93% $SiO_2$ and 3.6% $Al_2O_3$
Chrysolite=$MgFeSiO_4$
Dolomite=$CaMg(CO_3)_2$
Asbestos=magnesium silicate
Decolorizing carbon The second class of surface active catalysts require temperatures between 100° C. and 200° C. and preferably temperatures of from about 130° C. to about 160° C. This class of catalysts is somewhat more active than the first class and hence it is essential to employ them at temperatures below 200° C. in order to avoid destruction of substantial amounts of the camphene. Temperatures of from about 130° C. to about 145° C. have been found to be the most satisfactory. Of this second class of catalysts, I generally prefer fuller's earth. Representative members of this class of catalysts are:

Fuller's earth=aluminum silicate clay
Bentonite=aluminum silicate clay
Stargil=aluminum silicate clay
Tonsil=aluminum magnesium hydrosilicate The amount of catalyst employed may vary from about 0.01% to about 50% based on the camphene. The amount of catalyst will also vary to some extent with the temperatures employed and the time of reaction. The time of reaction may vary from a few minutes to several hours. The catalyst may be added gradually to the hot technical camphene during the course of reaction or it may all be added before the reaction is started. After the reaction is complete the catalyst may be separated from the product by filtration, by decantation or by steam distillation of the oily layer.

The reaction is preferably carried out in a closed vessel in the presence of air or other inert gas. The pressures will generally be those naturally due to the air or other gas and volatilization of the ingredients employed at the temperatures employed. Higher pressures may be employed by introducing the air or other inert gas in the closed vessel under pressure. After the reaction is complete the camphene may be separated from the impurities by fractional distillation or by the sweating process.

In order to illustrate my invention more clearly, the preferred modes of carrying the same into effect and the advantageous results to be obtained thereby, the following examples are given:

*Example I*

One hundred parts of technical camphene (F. P. 36° C.), obtained by isomerization of pinene, and 35 parts of vermiculite were charged into an iron autoclave. The mixture was agitated and heated at 245–250° C. for 10 hours. At the end of this period, the mixture was cooled to about 50 to 70° C. and the catalyst filtered. Purified camphene was then separated by fractional distillation. Eighty-eight parts of camphene having a freezing point of 48–50° C. were obtained. In addition to purified camphene, 2 parts of low boiling terpenes and 8 parts of polymerized residue were secured.

*Example II*

One hundred parts of technical camphene (freezing point 38° C.), obtained by isomerization of pinene, and 7.5 parts of pyrophyllite.

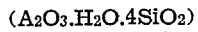
($A_2O_3.H_2O.4SiO_2$)

were charged into an iron autoclave. The mixture was agitated and heated at 250° C. for 10 hours. At the end of this period, the mixture was cooled to about 70° C. and the catalyst filtered. The purified camphene was then separated by fractional distillation. Eighty-five parts of purified camphene (freezing point 48° C.), 2 parts of low boiling terpenes and 10 parts of polymerized terpenes were secured.

*Example III*

One hundred parts of technical camphene (freezing point 36°) and 7.5 parts of kaolinite were charged into an iron autoclave. The mixture was agitated and heated at 225° C. for 10 hours. At the end of the 10 hour period, the mixture was cooled to about 60° C. and the catalyst filtered. The purified camphene was separated by fractional distillation. Eighty-six parts of purified camphene, having a freezing point of 45° C., 2 parts of low boiling terpenes and 10 parts of polymerized terpenes were secured.

*Example IV*

One hundred parts of camphene (F. P. 36° C.), and 3.5 parts of crude vermiculite were charged into an iron autoclave. The mixture was agitated and heated at 300° C. for 10 hours. At the end of this period, the mixture was cooled to about 60° C. and the catalyst separated by the filtration method. The purified camphene was separated by fractional distillation.

*Example V*

One hundred parts of camphene (F. P. 36° C.) were charged into an iron autoclave. The autoclave was then heated at 250° C. for 10 hours. At the end of the 10 hour period, the camphene was cooled and fractionally distilled. Eighty-five parts of camphene, freezing at 44° C., and 13 parts of polymerized terpenes were secured.

*Example VI*

One hundred parts of technical camphene (F. P. 36° C.) and 3.5 parts of fuller's earth were charged into a vessel. The mixture was agitated and heated at 140° C. for 8 hours. At the end of the 8 hour period, the mixture was cooled and the catalyst separated by filtration. Camphene was separated from the oily layer by fractional distillation. Eighty-seven parts of camphene, F. P. 46.5, and fifteen parts of polymerized terpenes were secured.

*Example VII*

One hundred parts of technical camphene (F. P. 38° C.) and 3.5 parts of bentonite were charged into a vessel and agitated at 150° C. for 10 hours. At the end of the 10 hour period, the mixture was cooled and the catalyst filtered. Camphene (F. P. 44° C.) was separated from the oily layer by fractional distillation. Eighty-eight parts of camphene (F. P. 44) and 8 parts of polymerized terpene were secured.

*Example VIII*

One thousand parts of technical camphene (F. P. 39° C.) and 0.5 part of stargil were charged into a vessel and agitated at 140° C. for 10 hours. At the end of the 10 hour period, the reaction mixture was filtered to remove the catalyst. Camphene, having a freezing point of 46° C., was separated from the oily layer by fractional distillation. Eight hundred and fifty parts of camphene (F. P. 46° C.) and 130 parts of polymerized terpenes were secured.

*Example IX*

One hundred parts of technical camphene (F. P. 38° C.) and 15 parts of 50% sulfuric acid solution were agitated in a vessel at 40° C. for 10 hours. At the end of the 10 hour period, the aqueous layer was separated. The oily layer was washed with dilute alkali. Camphene was then separated by fractional distillation. Eighty-six parts of camphene (F. P. 45° C.) and 7.6 parts of polymerized terpenes were obtained.

Example X

One hundred parts of camphene (F. P. 36° C.) and 0.05 part of tonsil were charged into a vessel and agitated for 10 hours at 140° C. At the end of the 10 hour period, the catalyst was filtered and camphene separated from the oily layer by fractional distillation. Eighty-seven parts of camphene, having a F. P. of 45° C., and 13 parts of polymerized terpenes were secured.

It will be understood that the above examples are given for illustrative purposes only and that my invention is not to be limited to the specific embodiments particularly disclosed. It will be readily apparent to those skilled in the art that many variations and modifications may be made in the process, particularly in the catalysts and temperatures employed without departing from the spirit of my invention. Accordingly, I intend to claim my invention broadly as in the appended claims.

From the examples, it will be apparent that, by my process, I am able to materially improve and purify the technical camphene. From the purified camphene obtained by my process, I may produce camphor having a melting point ranging from about 169° C. to about 175° C. Accordingly, it will be apparent that the improved quality of camphene, obtained by my invention, is of considerable importance in the manufacture of camphor. The process of my invention may be employed in the purification of technical camphene, obtained by the catalytic isomerization of pinene or that obtained from bornyl chloride.

Camphene of high purity, having a freezing point of from about 45° C. to about 48° C., may also be produced directly from pinene by treating freshly distilled pinene with vermiculite in the presence of either hydroquinone or decolorizing carbon at temperatures of from about 80° C. to about 300° C. The vermiculite may be employed in proportion of from about 0.5% to about 80% of the amount of pinene. The hydroquinone may be employed in the proportion of 0.01% to about 5% of the amount of the pinene. The decolorizing carbon, when employed, may vary from about 0.5% to about 50% of the amount of the pinene. The reaction may be carried out at atmospheric pressures or under superatmospheric pressures. Impure or crude pinene may be employed. In such process, it appears that impurities, formed during the reaction, are converted to higher boiling compounds from which the camphene may be separated by fractional distillation. This process is described and claimed in the joint co-pending application of Clyde O. Henke and myself filed May 23, 1941, as Serial No. 394,802, for "Process for preparing camphene."

I claim:

1. The method of purifying technical camphene which comprises heating technical camphene with a surface active catalyst of the class consisting of vermiculite, pyrophyllite, kaolinite, kieselguhr, chrysolite and asbestos in a closed vessel under superatmospheric pressures at temperatures of from about 225° C. to about 350° C. for sufficient time to selectively convert the major proportion of the impurities to higher boiling compounds, and then separating camphene from the resulting products.

2. The method of purifying technical camphene which comprises heating technical camphene with vermiculite in a closed vessel under superatmospheric pressures at temperatures of from about 225° C. to about 350° C. for sufficient time to selectively convert the major proportion of the impurities to higher boiling compounds, and then separating camphene from the resulting products.

3. The method of purifying technical camphene which comprises heating technical camphene with vermiculite in a closed vessel under superatmospheric pressures at temperatures of from about 245° C. to about 300° C. for sufficient time to selectively convert the major proportion of the impurities to higher boiling compounds, and then separating camphene from the resulting products.

4. The method of purifying technical camphene which comprises heating technical camphene with pyrophyllite in a closed vessel under superatmospheric pressures at temperatures of from about 225° C. to about 350° C. for sufficient time to selectively convert the major proportion of the impurities to higher boiling compounds, and then separating camphene from the resulting products.

5. The method of purifying technical camphene which comprises heating technical camphene with an aluminum silicate clay of the character of fuller's earth and bentonite in a closed vessel under superatmospheric pressures at temperatures of from about 130° C. to about 160° C. for sufficient time to selectively convert the major proportion of the impurities to higher boiling compounds, and then separating camphene from the resulting products.

6. The method of purifying technical camphene which comprises heating technical camphene with fuller's earth in a closed vessel under superatmospheric pressures at temperatures of from about 130° C. to about 160° C. for sufficient time to selectively convert the major proportion of the impurities to higher boiling compounds, and then separating camphene from the resulting products.

7. The method of purifying technical camphene which comprises heating technical camphene with a surface active solid silicate catalyst of group consisting of fuller's earth, bentonite, stargil, tonsil, vermiculite, pyrophyllite, kaolinite, kieselguhr, chrysolite and asbestos in a closed vessel at temperatures of from about 100° C. to about 350° C. for sufficient time to selectively convert the major proportion of the impurities to higher boiling compounds, and then separating camphene from the resulting products.

GASTAO ETZEL.